(12) United States Patent
Reinoehl et al.

(10) Patent No.: US 11,359,680 B2
(45) Date of Patent: Jun. 14, 2022

(54) CLUTCH ASSEMBLY HAVING HIGH REPEATABILITY AND SERVICABILITY

(71) Applicant: Eaton Intelligent Power Limited, Dublin (IE)

(72) Inventors: Troy Scott Reinoehl, Pine, CO (US); James Lee Whitaker, Hicksville, OH (US); Steven Michael Peterson, LaOtto, IN (US); Clinton Lee McClellan, Avilla, IN (US); Paige Elizabeth Canzonieri, Brooklyn Park, MN (US)

(73) Assignee: Eaton Intelligent Power Limited, Dublin (IE)

( * ) Notice: Subject to any disclaimer, the term of this patent is extended or adjusted under 35 U.S.C. 154(b) by 238 days.

(21) Appl. No.: 16/441,856

(22) Filed: Jun. 14, 2019

(65) Prior Publication Data
US 2019/0293128 A1  Sep. 26, 2019

Related U.S. Application Data

(63) Continuation of application No. PCT/US2017/066594, filed on Dec. 15, 2017.

(Continued)

(51) Int. Cl.
*F16D 13/46* (2006.01)
*F16D 13/75* (2006.01)
(Continued)

(52) U.S. Cl.
CPC .............. *F16D 13/757* (2013.01); *B60S 5/00* (2013.01); *F16D 13/585* (2013.01); *F16D 23/14* (2013.01);
(Continued)

(58) Field of Classification Search
CPC ...... F16D 13/757; F16D 13/46; F16D 13/583; F16D 13/70
See application file for complete search history.

(56) References Cited

U.S. PATENT DOCUMENTS 5,320,205 A * 6/1994 Kummer ............... F16D 13/757
192/111.5
6,186,302 B1 * 2/2001 Drexl ................... F16D 13/757
192/111.15
(Continued)

FOREIGN PATENT DOCUMENTS

DE 102014118441 A1 6/2015
WO 2018112304 A1 6/2018

OTHER PUBLICATIONS

PCT/US2017/066594, "International Application Serial No. PCT/US2017/066594, International Preliminary Report on Patentability dated Jun. 27, 2019", Eaton Corporation, 7 pages.
(Continued)

*Primary Examiner* — Huan Le
(74) *Attorney, Agent, or Firm* — GTC Law Group PC & Affiliates

(57) ABSTRACT

A clutch assembly includes a clutch disc configured to engage a prime mover, a pressure plate having a clutch biasing element, and a clutch engagement member structured to couple to a clutch actuation element at an engagement position. The clutch adjustment member maintains a consistent engagement position as a face of the clutch disc experiences wear.

14 Claims, 17 Drawing Sheets

Related U.S. Application Data

(60) Provisional application No. 62/434,821, filed on Dec. 15, 2016.

(51) Int. Cl.
| | | |
|---|---|---|
| *B60S 5/00* | (2006.01) | |
| *F16D 65/38* | (2006.01) | |
| *F16D 13/58* | (2006.01) | |
| *F16D 23/14* | (2006.01) | |
| *B62D 65/10* | (2006.01) | |
| *F16D 13/70* | (2006.01) | |

(52) U.S. Cl.
CPC .............. *F16D 65/38* (2013.01); *B62D 65/10* (2013.01); *F16D 13/46* (2013.01); *F16D 13/583* (2013.01); *F16D 13/70* (2013.01); *F16D 2023/141* (2013.01)

(56) References Cited

U.S. PATENT DOCUMENTS

| | | |
|---|---|---|
| 2004/0159522 A1 | 8/2004 | Conrad et al. |
| 2006/0113156 A1 | 6/2006 | McCutcheon et al. |
| 2006/0116232 A1 | 6/2006 | McCutcheon |
| 2014/0284165 A1 | 9/2014 | Reinoehl et al. |

OTHER PUBLICATIONS

PCT/US2017/066594, "International Application Serial No. PCT/US2017/066594, International Search Report and Written Opinion dated Feb. 14, 2018", Eaton Corporation, 13 Pages.

\* cited by examiner

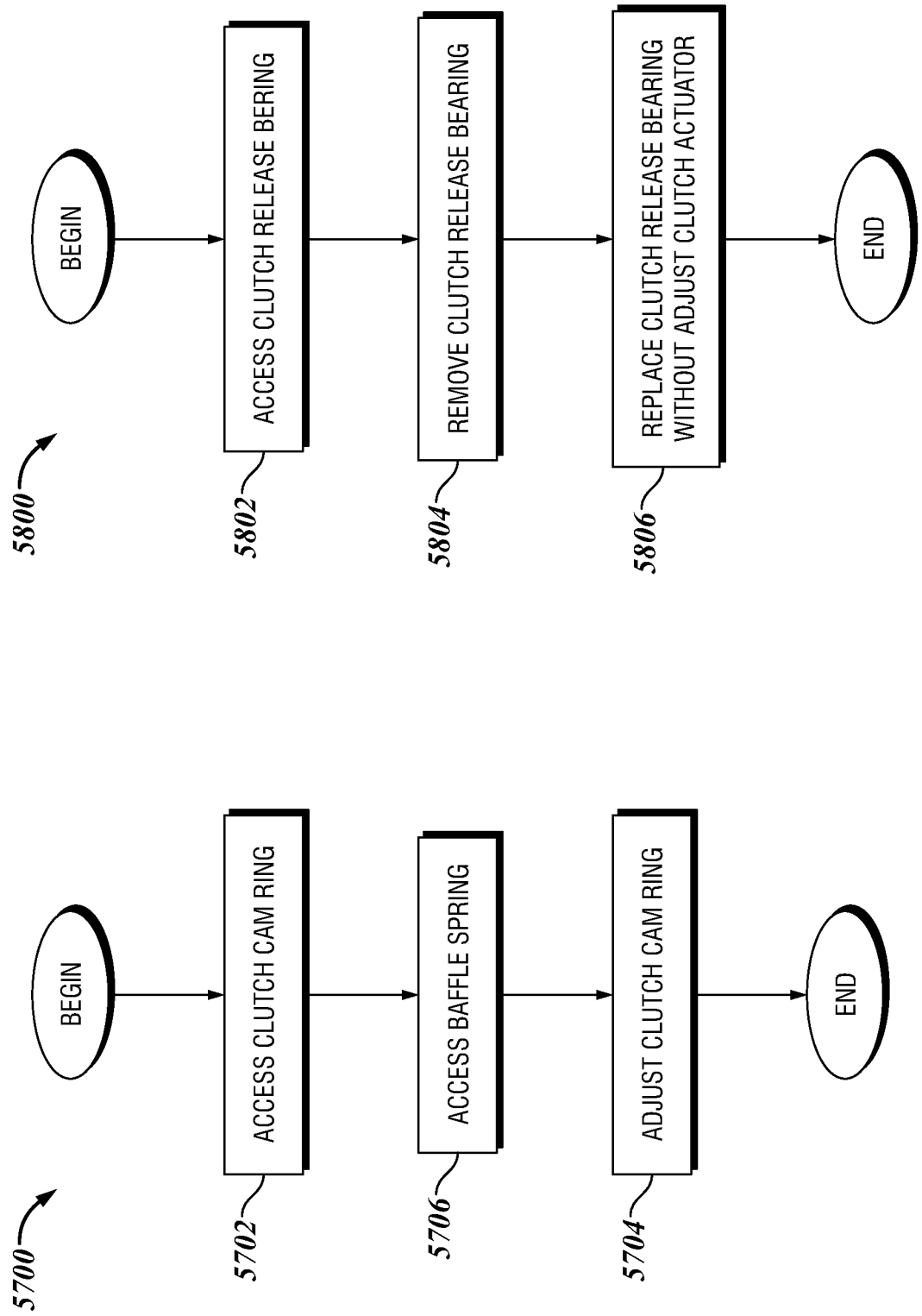

CLUTCH ASSEMBLY HAVING HIGH REPEATABILITY AND SERVICABILITY

CROSS REFERENCE TO RELATED APPLICATIONS

This application is a continuation of International Application No. PCT/US2017/066594 (EATN-1090-WO) filed Dec. 15, 2017, entitled "CLUTCH ASSEMBLY HAVING HIGH REPEATABILITY AND SERVICABILITY."

International Application No. PCT/US2017/066594 (EATN-1090-WO) claims priority to U.S. Provisional Patent Application 62/434,821, filed Dec. 15, 2016, and entitled "CLUTCH ASSEMBLY HAVING HIGH REPEATABILITY AND SERVICABILITY."

BACKGROUND

Field

Without limitation to a particular field of technology, the present disclosure is directed to clutch assemblies configured for coupling to a transmission, and more particularly to transmissions for vehicle applications, including truck applications.

Transmissions serve a critical function in translating power provided by a prime mover to a final load. The transmission serves to provide speed ratio changing between the prime mover output (e.g. a rotating shaft) and a load driving input (e.g. a rotating shaft coupled to wheels, a pump, or other device responsive to the driving shaft). The ability to provide selectable speed ratios allows the transmission to amplify torque, keep the prime mover and load speeds within ranges desired for those devices, and to selectively disconnect the prime mover from the load at certain operating conditions.

A clutch assembly couples the prime mover to the transmission, providing for selective coupling and decoupling to the prime mover. Clutch assemblies are subject to wear at the clutch face, and the response and actuation behavior of previously known clutch assemblies changes over time with wear of the clutch face. Servicing of previously known clutch actuators can be an expensive and time consuming process. Most types of service events for a clutch assembly include dropping the transmission, removing a related actuator, and/or disassembling significant portions of the driveline for the application. Previously known clutch assemblies for high output transmissions utilize concentric clutch actuators which require complex actuation and service. Accordingly, there remains a need for improvements in the design of clutch assemblies.

SUMMARY

An example clutch assembly includes a clutch disc configured to engage a prime mover, a pressure plate having a clutch biasing element, where the clutch engagement member couples to a clutch actuation element at an engagement position, and where a clutch adjustment member maintains a consistent engagement position as a face of the clutch disc experiences wear. Certain further embodiments of an example clutch assembly are described following. An example clutch assembly includes the clutch adjustment member having a cam ring operable to rotate in response to clutch disc wear; a pressure plate defining the clutch biasing element and the clutch adjustment member; the pressure plate further defining access holes for the clutch adjustment member; the clutch assembly further including an anti-rotation member operationally coupled to the clutch adjustment member to enforce one-way movement of the clutch adjustment member; and/or the pressure plate further defining at least one access channel for the anti-rotation member.

An example clutch assembly includes a clutch disc configured to engage a prime mover, a pressure plate having a clutch biasing element (e.g., a diaphragm spring, disc spring, or the like), a pressure plate having a clutch biasing element, and a clutch engagement member structured to couple to a clutch actuation element at an engagement position (e.g., a release bearing). The example clutch assembly further includes a clutch adjustment member that maintains a consistent engagement position as a face of the clutch disc experiences wear.

Certain further aspects of an example clutch assembly are described following, any one or more of which may be present in certain embodiments. An example clutch assembly further includes the clutch adjustment member including a cam ring operable to rotate in response to clutch disc wear, a pressure plate defining the clutch biasing element and the clutch adjustment member, and/or the pressure plate further defining at least one access channel for the clutch adjustment member. An example clutch assembly further includes an anti-rotation member operationally coupled to the clutch adjustment member to enforce one-way movement of the clutch adjustment member, and/or the pressure plate further including at least one access channel for the anti-rotation member. An example clutch assembly further includes an anti-rotation member operationally coupled to the clutch adjustment member to enforce one-way movement of the clutch adjustment member, where the anti-rotation member includes a baffle spring structured to engage teeth of the cam ring, and/or where the access channel(s) are sized to allow insertion of a tool having an offset at an insertion end of the tool.

An example clutch assembly includes a clutch disc that engages a fly wheel of a prime mover, a pressure plate having a diaphragm spring that biases the clutch disc to an engaged position, and a cam ring that rotates in response to clutch disc wear, and thereby maintains a consistent engagement position of the clutch disc to the fly wheel. The example cam ring includes a number of ramps or other progressive features that move the position of the clutch disc as the cam ring rotates.

Certain further aspects of an example clutch assembly are described following, any one or more of which may be present in certain embodiments. An example clutch assembly further includes the cam ring structured such that rotation of the cam ring adjusts the clutch face position, at least one control finger that limits a maximum adjustment of the clutch face position by the cam ring, and/or a diaphragm spring that receives a linear actuating force, and where the clutch disc is moved to a disengaged position in response to the linear actuating force on the diaphragm spring.

An example method includes adjusting a position of a clutch face for a clutch assembly, where the adjusting includes accessing teeth of a cam ring, and rotating the cam ring. Certain further aspects of the example method are described following, any one or more of which may be included in certain embodiments. An example method further includes disengaging a baffle spring from the teeth of the cam ring before the rotating the cam ring; where accessing the teeth of the cam ring is performed on a clutch assembly installed in a vehicle, without disengaging a transmission having the clutch assembly from a prime mover; installing a new clutch assembly on a transmission, and adjusting the position of the clutch face for the clutch assembly after the installing; adjusting the position of the clutch face with the transmission still engaged to a prime mover; accessing the teeth of the cam ring through a channel in a housing defining the clutch assembly.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures:

FIG. 19 is a schematic flow diagram depicting a procedure to adjust a clutch.

FIG. 20 is a schematic flow diagram depicting a procedure to service a clutch release bearing.

DETAILED DESCRIPTION

Figure 8:
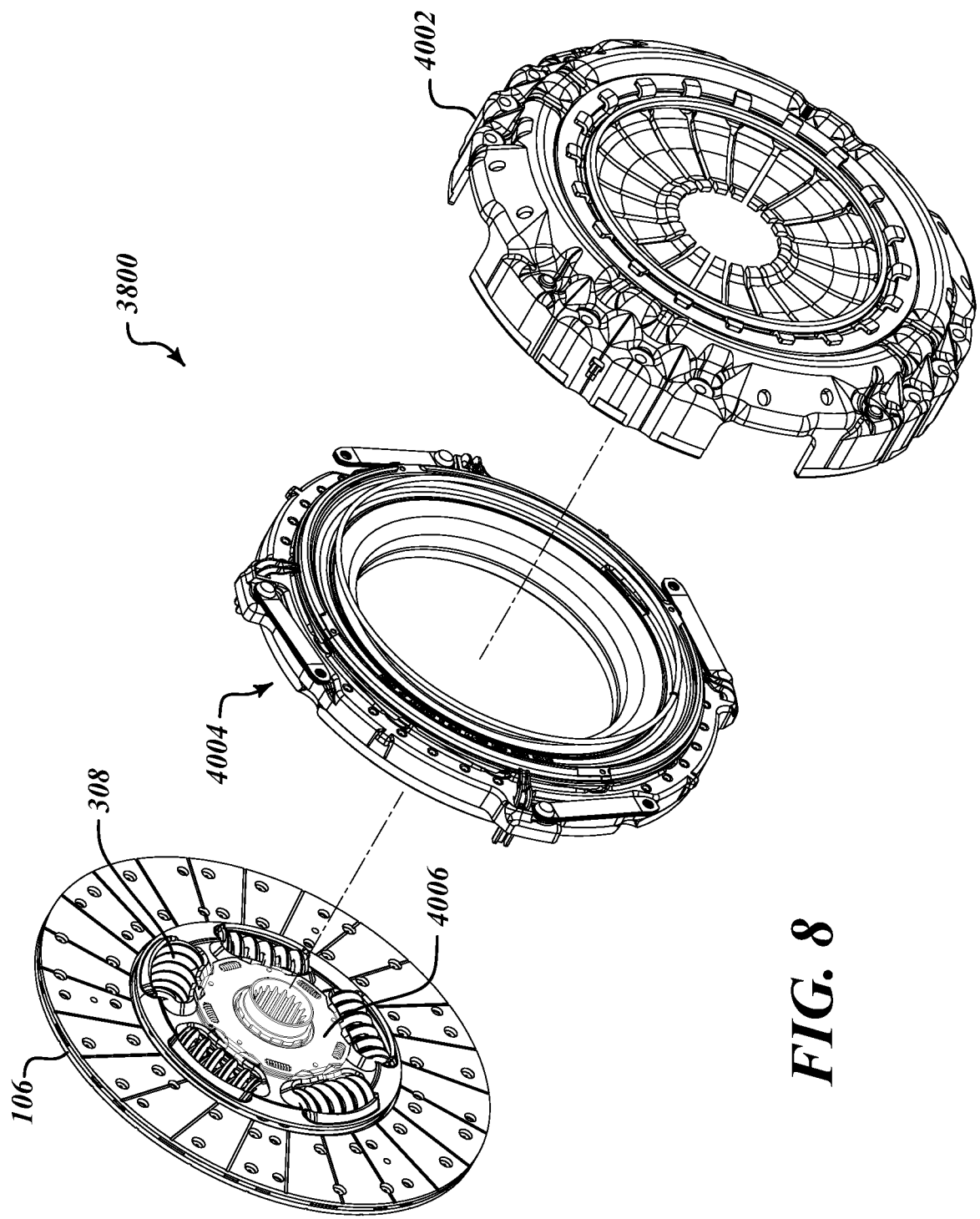
FIG. 8 depicts an example clutch assembly in exploded view.

Example clutch assemblies depicted herein include a clutch 106 (e.g. reference FIG. 8). The example clutch includes a clutch face 306 and one or more torsional springs 308 (e.g. reference FIG. 3). Example clutch face 306 includes a number of frictional plates, and the clutch face 306 presses against an opposing face from a prime mover (not shown), for example a flywheel of the engine. The torsional springs 308 of the example clutch face 306 provide rotational damping of the clutch 106 to transient forces while maintaining steady state alignment of the clutch 106. The clutch face 306 may alternatively be any type of clutch face understood in the art, including for example a single frictional surface rather than frictional plates. In the example clutch face 306, the frictional plates are included as a portion of the clutch face 306. The divisions between the clutch plates are provided as grooved divisions of the clutch face 306 base material to provide desired performance (e.g. frictional performance, debris management, and/or heat transfer functions), but any clutch face 306 configuration including alternate groove patterns and/or no presence of grooves is contemplated herein. The material of the example clutch face 306 may be any material understood in the art, including at least a ceramic material and/or organic clutch material. In embodiments, as depicted in more detail below, the clutch 106 may be positioned off-axis relative to the prime mover, is disposed around (such as via a yoke, horseshoe or similar configuration) the prime mover (e.g., a shaft), is pivotably anchored on one side (such as by a hinge or similar mechanism that allows it to pivot in the desired direction of movement of the clutch 106, and is actuated by the linear clutch actuator (which may also be positioned off-axis, opposite the anchoring side, so that linear actuation causes the clutch to pivot in the desired direction).

Figure 1:
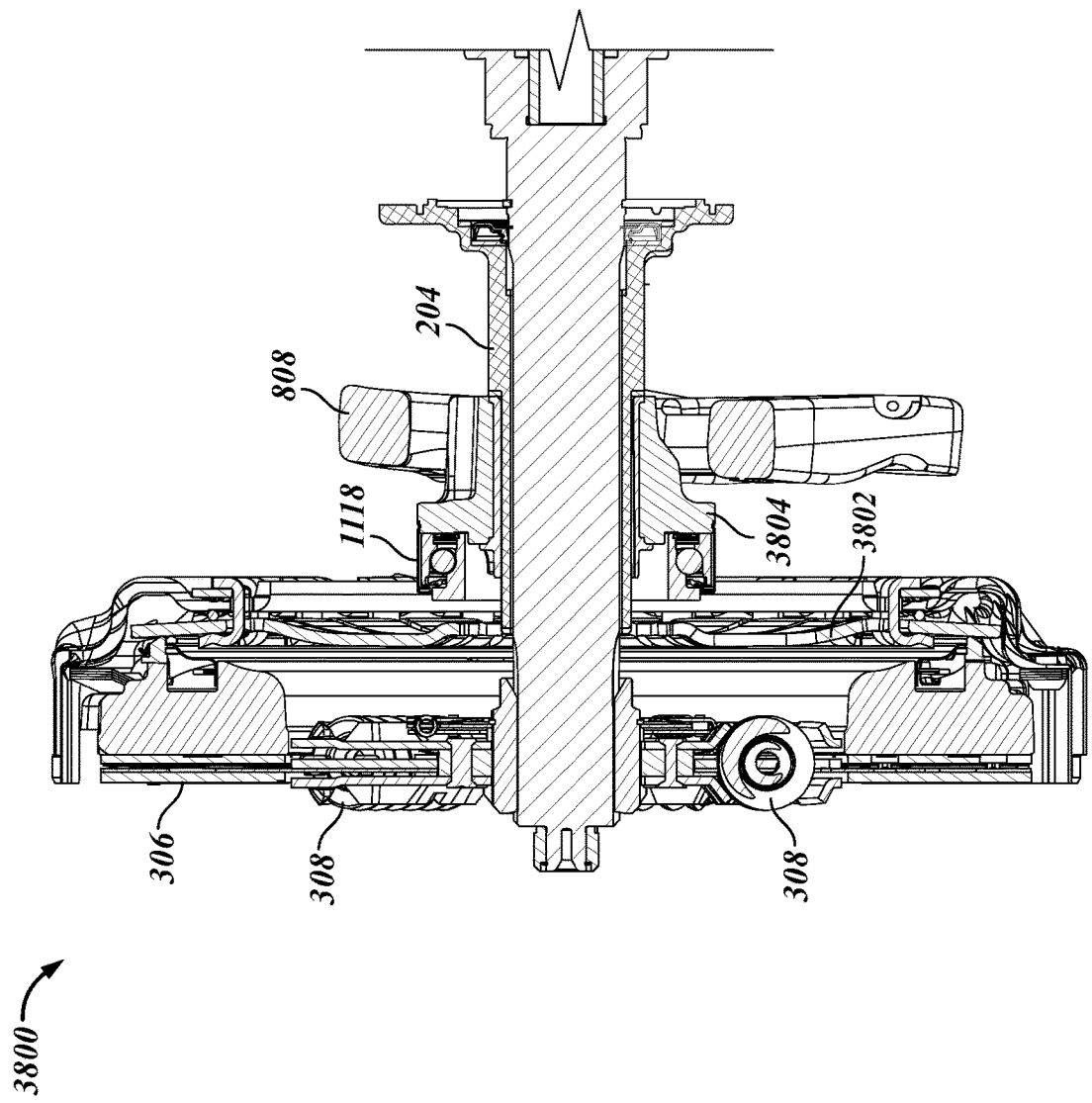
FIG. 1 depicts an example clutch assembly.
Figure 2:
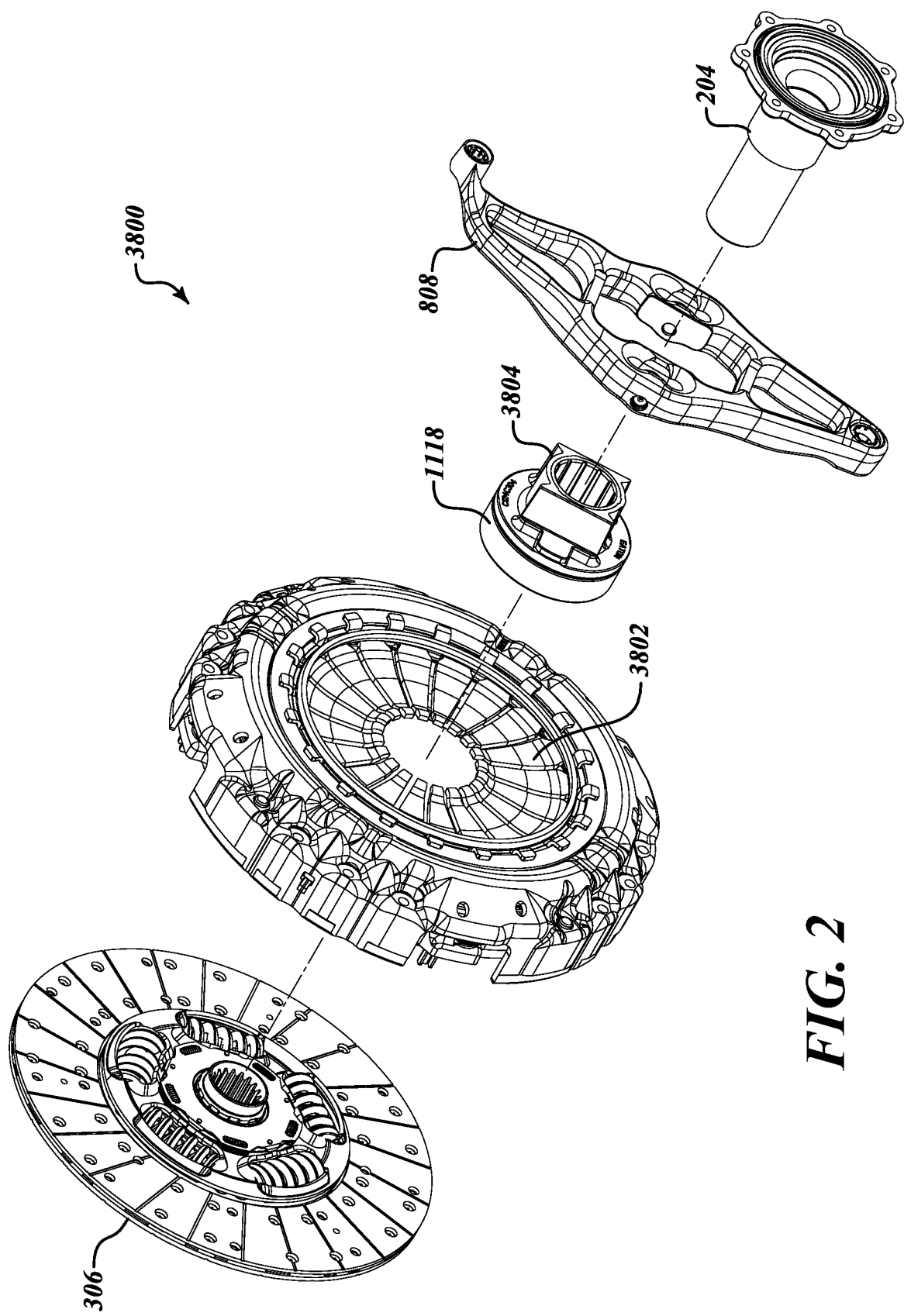
FIG. 2 depicts an example clutch assembly in exploded view.

Referencing FIGS. 1 and 2, an example clutch operation assembly 3800 is depicted illustrating certain aspects of a clutch assembly and certain operational portions of a transmission interacting with the clutch assembly. The example clutch operation assembly 3800 includes an input shaft 204 and a release bearing 1118, and the clutch face 306 that engages the prime mover. The example clutch operation assembly 3800 further includes a diaphragm spring 3802 that biases the clutch face 306 to an engaged position (toward the prime mover and away from the transmission), and upon actuation by a clutch engagement yoke 808 (e.g. the clutch engagement yoke 808 pushed forward by the clutch actuator 1002) withdraws the clutch face 306 from the engaged position. Any other actuation mechanism for a clutch is contemplated herein. The clutch operation assembly 3800 further includes a bearing housing 3804 that engages and retains the release bearing 1118, and further includes a landing face on the release bearing 1118 that engages the clutch engagement yoke 808.

Figure 3:
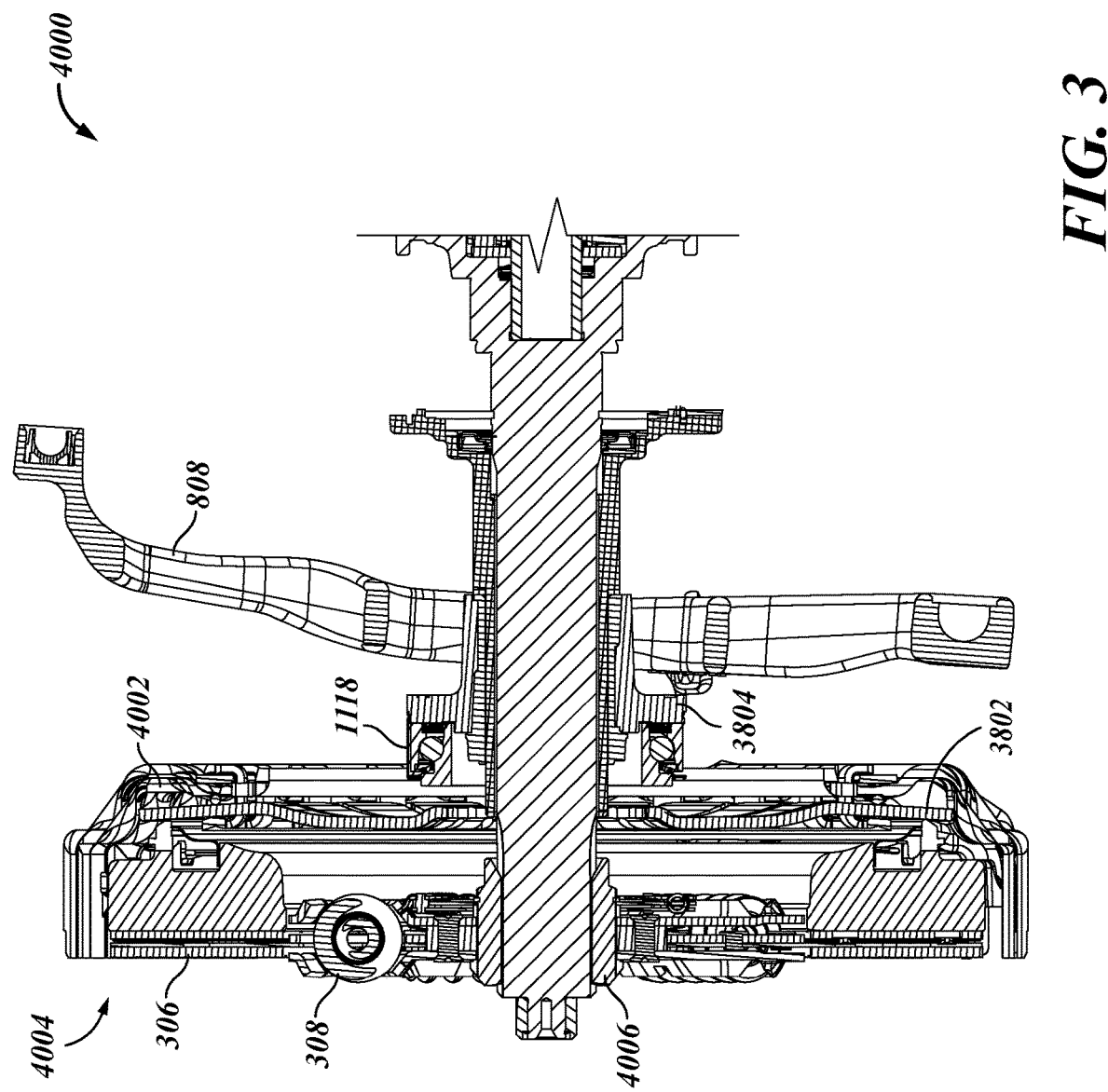
FIG. 3 depicts a side cutaway view of an example clutch assembly.

Referencing FIG. 3, a side view of a clutch assembly 4000 is depicted in cutaway view, with certain additional aspects such as the clutch engagement yoke 808, the input shaft 204, the release bearing 1118, and the bearing housing 3804 depicted in engagement with the clutch assembly 4000. The clutch assembly 4000 includes the clutch face 306, a torsional spring 308 (e.g. for dampening clutch face 306 rotation), a diaphragm spring assembly bracket 4002, a pressure plate assembly 4004, and an inner hub 4006 structured, in one example, to couple the engaged clutch to the input shaft 204.

Figure 5:
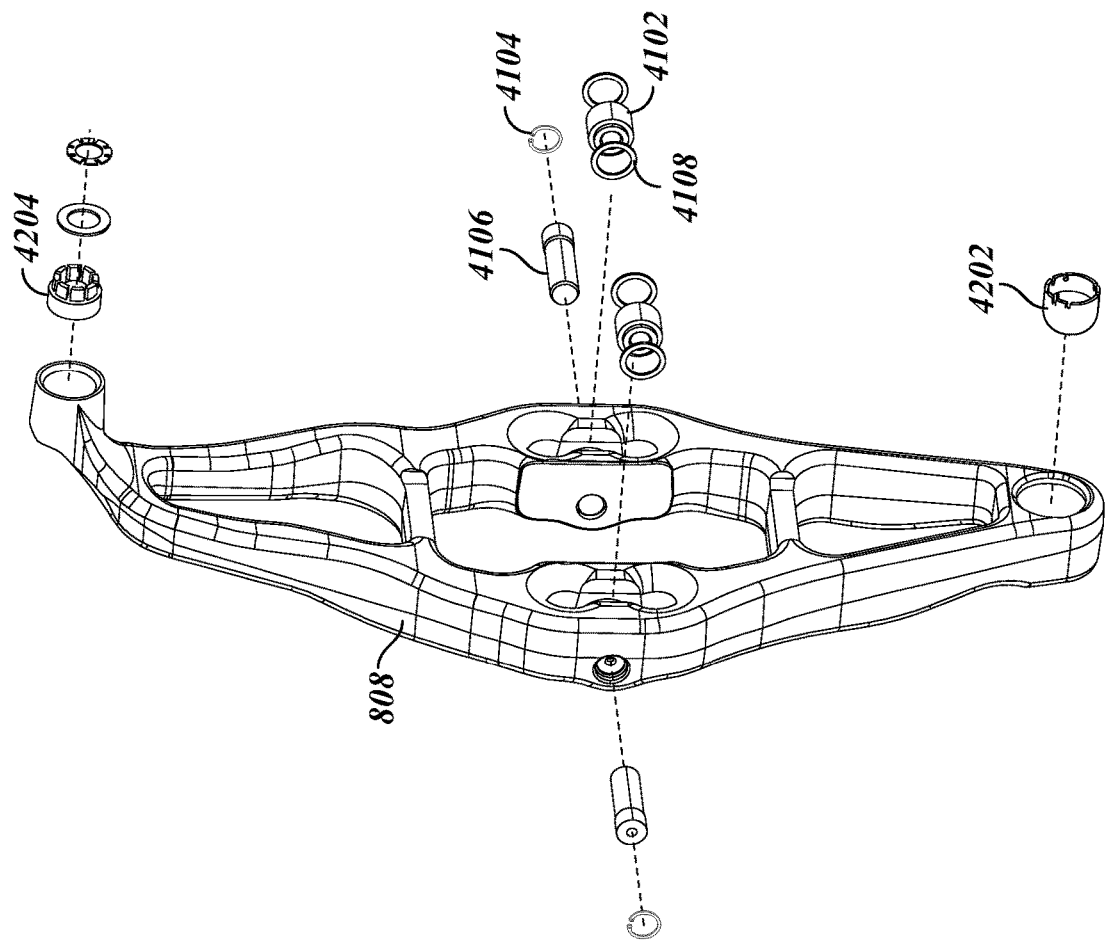
FIG. 5 depicts an example clutch engagement yoke in exploded view.
Figure 4:
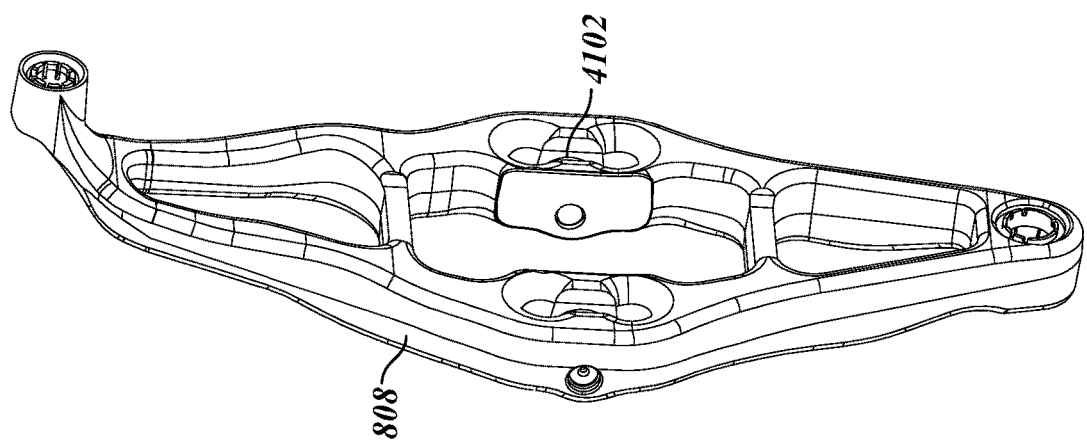
FIG. 4 depicts an example clutch engagement yoke.

Referencing FIG. 4, a detail view of an example clutch engagement yoke 808 is depicted, having the clutch engagement yoke, an actuator interface at the top, and a pivot interface at the bottom. The example clutch engagement yoke 808 includes yoke rollers 4102 positioned at engagement points on the clutch engagement yoke 808. Referencing FIG. 5, example yoke rollers 4102 are retained with snap rings 4104, pin rollers 4106, and quad rings 4108. The example clutch engagement yoke 808 further includes a lower retainer 4202 that engages a pivot at a bottom of the clutch engagement yoke 808, and a rod retainer 4204 that engages the linear clutch actuator 1002 at a top of the clutch engagement yoke 808. The details of the clutch engagement yoke 808 depict an example consistent with operations using a linear clutch actuator 1002, but any clutch engagement device is contemplated herein.

Figure 6:
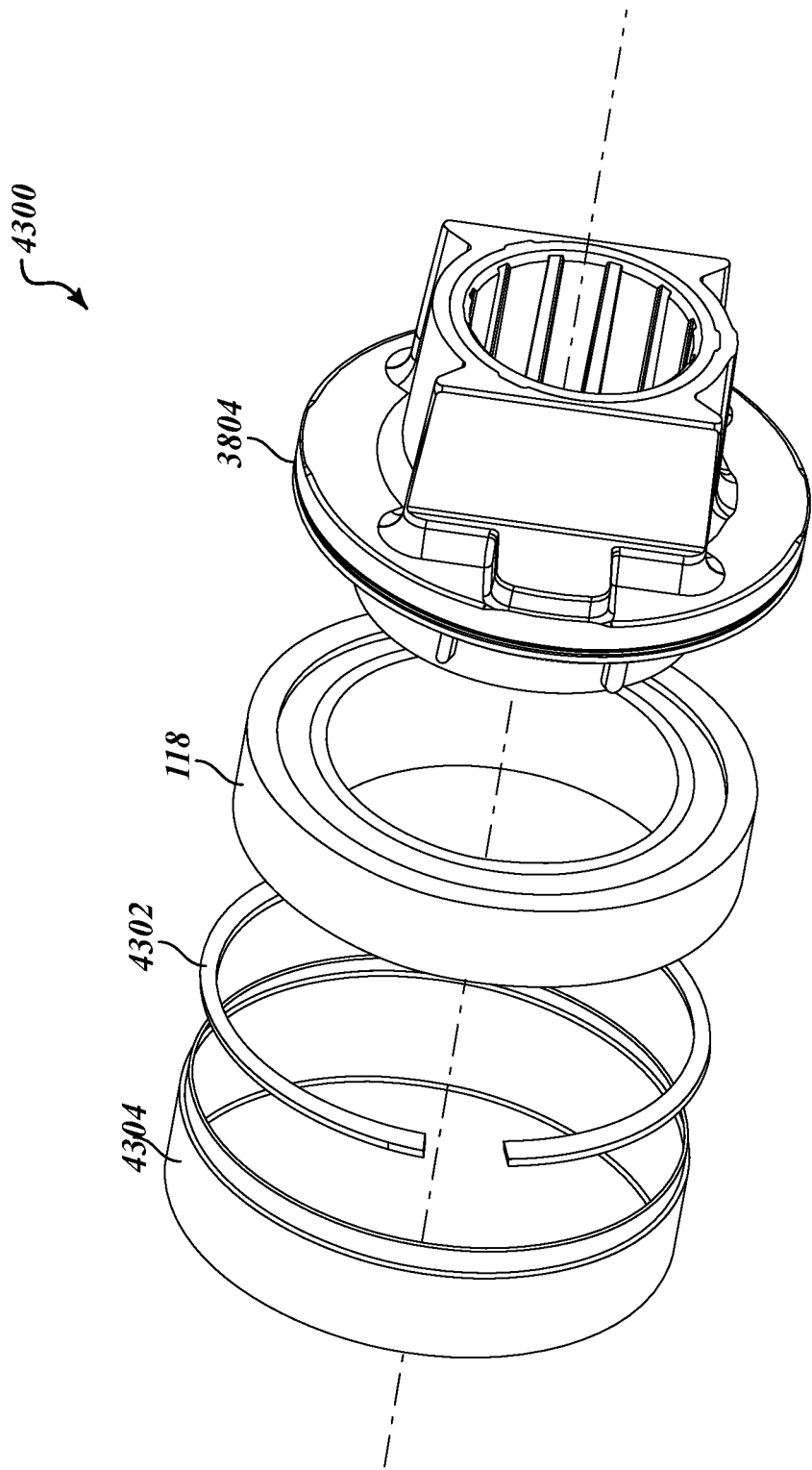
FIG. 6 depicts an example clutch release bearing in exploded view.
Figure 7:
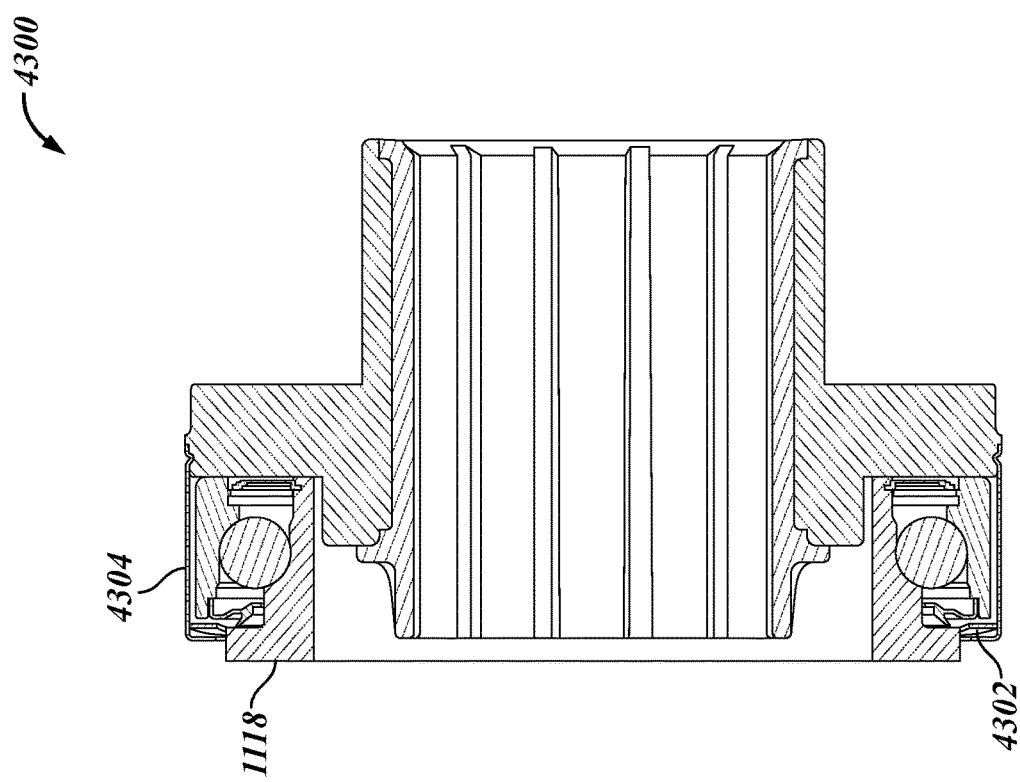
FIG. 7 depicts an example clutch release bearing in a side cutaway view.

Referencing FIG. 6, an example release bearing assembly 4300 is depicted in exploded view. The release bearing assembly 4300 includes the release bearing 1118, the release bearing housing 3804, a wave retaining ring 4302, and a shield 4304. The example release bearing assembly 4300 is non-limiting, and other arrangements to retain and protect the release bearing 1118 are contemplated herein. Referencing FIG. 7, a side cutaway view of the example release bearing assembly 4300 is depicted.

Figure 9B:
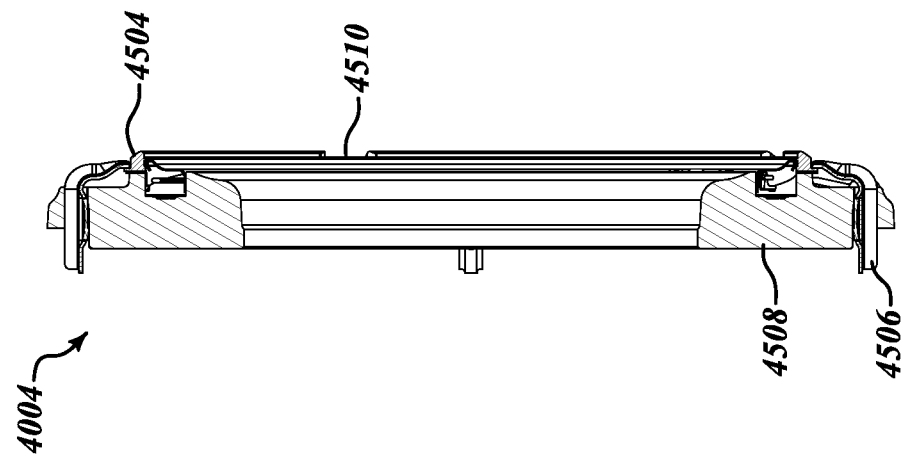
FIGS. 9A and 9B depict an example pressure plate.
Figure 9A:
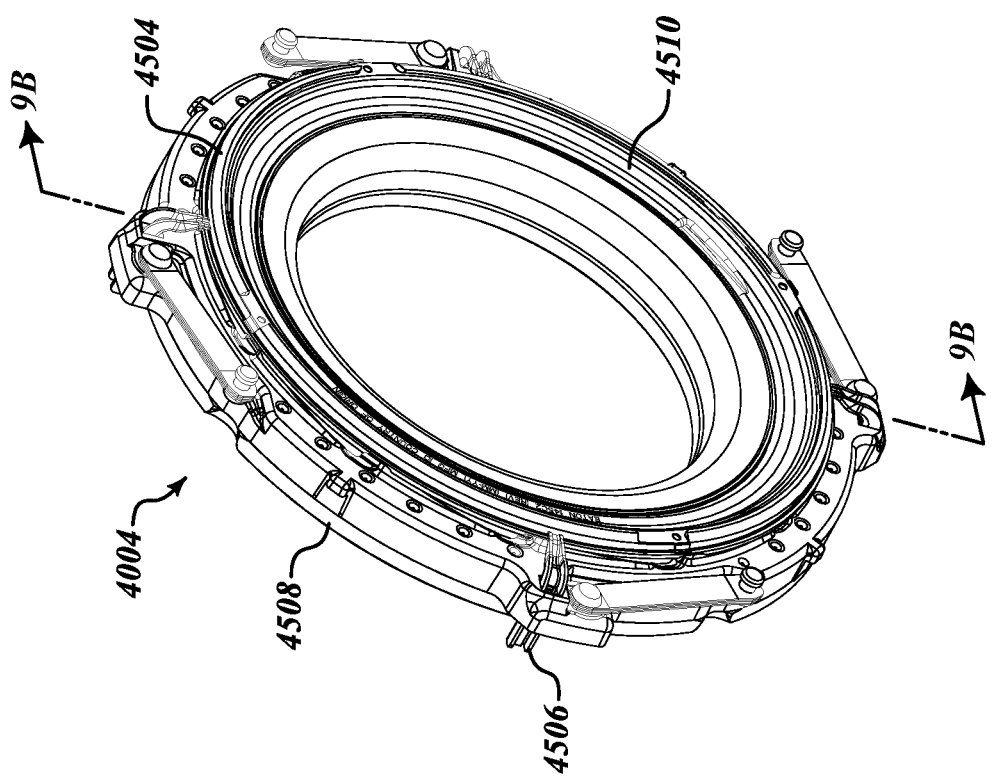

Referencing FIG. 8, a portion of the clutch operation assembly 3800 is depicted in exploded view. The clutch operation assembly 3800 includes the clutch 106, having torsion springs 308 and a pre-damper assembly 4004 coupled thereto. The clutch operation assembly 3800 includes a pressure plate assembly 4004 and the diaphragm spring assembly bracket 4002. Referencing FIGS. 9A and 9B, a detail view of the example pressure plate assembly 4004 is depicted in a perspective view (FIG. 9A) and a side cutaway view (FIG. 9B). The example pressure plate assembly 4004 includes a cam ring 4504 and control fingers 4506 coupled to a pressure plate 4508. The cam ring 4504 rotates and cooperates with the control fingers 4506 to position the clutch 106 such that, as the clutch face wears 306, the release bearing 1118 maintains a same position relative to the clutch engagement yoke 808. Accordingly, even as the clutch face 306 wears, the engagement location on the transmission side of the clutch assembly remains in a consistent position. After a selected amount of wear, the control fingers 4506 prevent further adjustment, and engagement location on the transmission side of the clutch assembly will begin to move with further wear on the clutch face 306. Accordingly, a high degree of repeatability for clutch engagement is provided by the clutch assembly 3800, while the clutch continues to be operable past the selected amount of wear. The example pressure plate assembly 4004 includes a torsion spring (not shown) coupled to the cam ring 4504 to urge rotation of the cam ring 4504 as the clutch face 306 wears, and a cam baffle 4510 having teeth thereon to prevent counter-rotation of the cam ring 4504.

Figure 10:
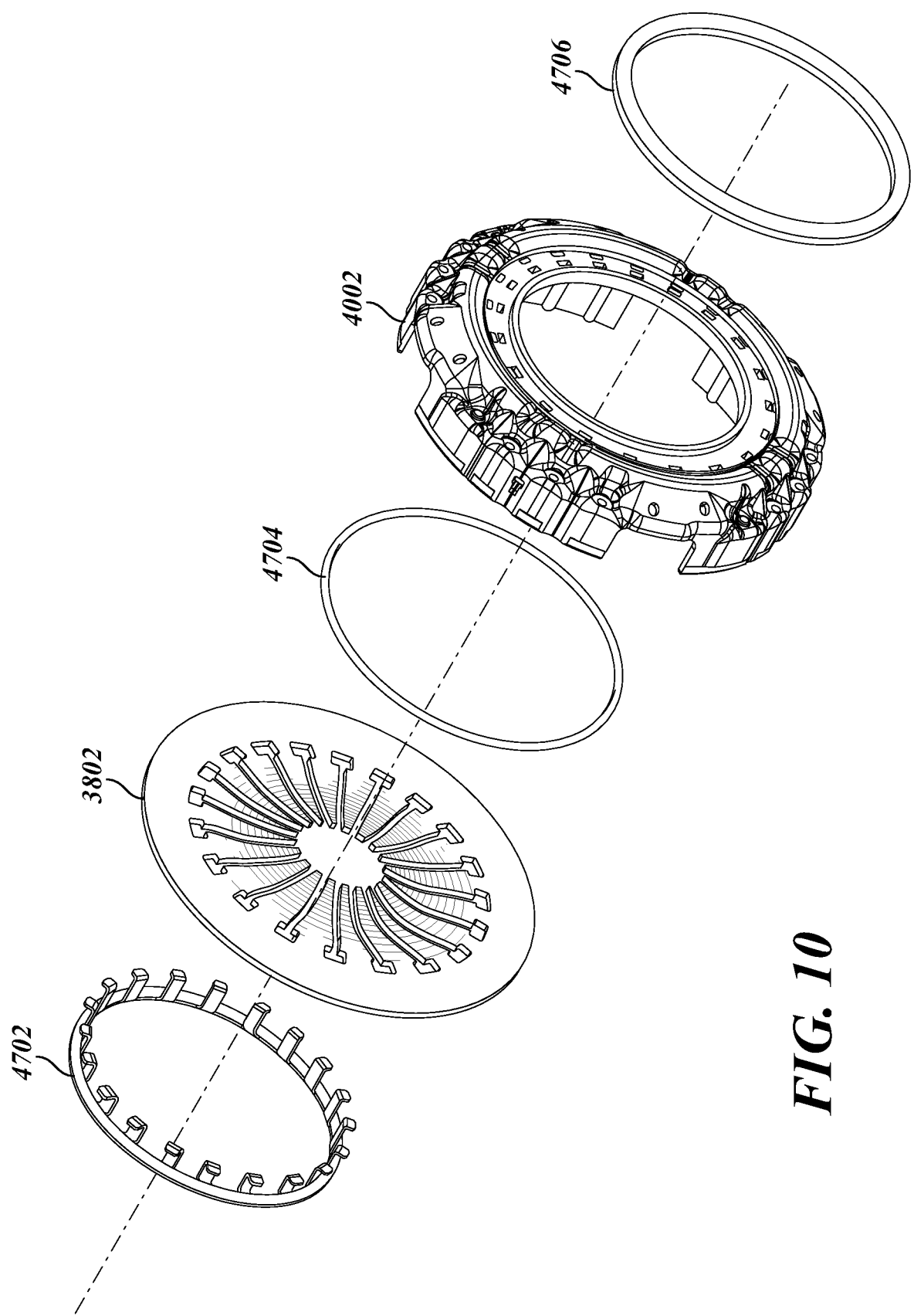
FIG. 10 depicts an example pressure plate bracket in exploded view.
Figure 11:
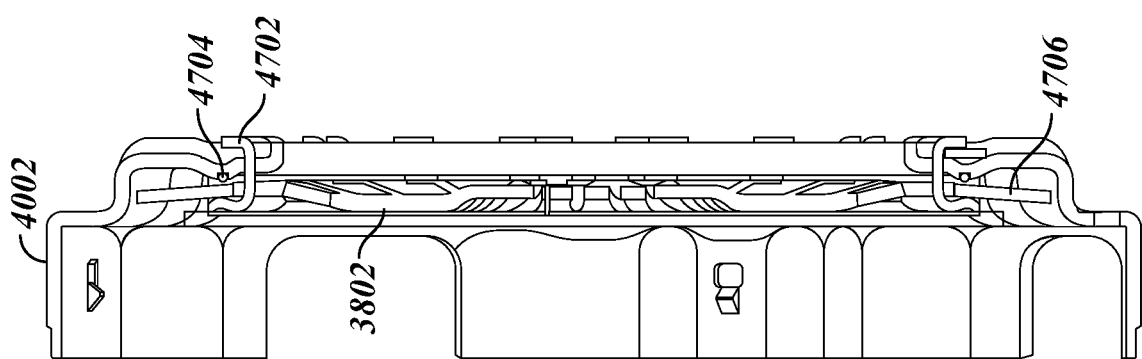
FIG. 11 depicts an example pressure plate bracket in side cutaway view.

Referencing FIG. 10, an example diaphragm spring assembly bracket 4002 is depicted in exploded view with certain related components. The depiction of FIG. 10 includes the diaphragm spring 3802. The shape and strength of the diaphragm spring 3802 (e.g. material, geometry, deformation, etc.) determines the clutch engagement movement and force. The depiction of FIG. 10 further includes a lower fulcrum ring 4702, a welded fulcrum ring 4704, and a pre-load spring 4706. Referencing FIG. 11, a cutaway side view of the diaphragm spring assembly bracket 4002 depicts an example arrangement of the diaphragm spring 3802, the welded fulcrum ring 4704, the lower fulcrum ring 4702, and the pre-load spring 4706.

Figure 12:
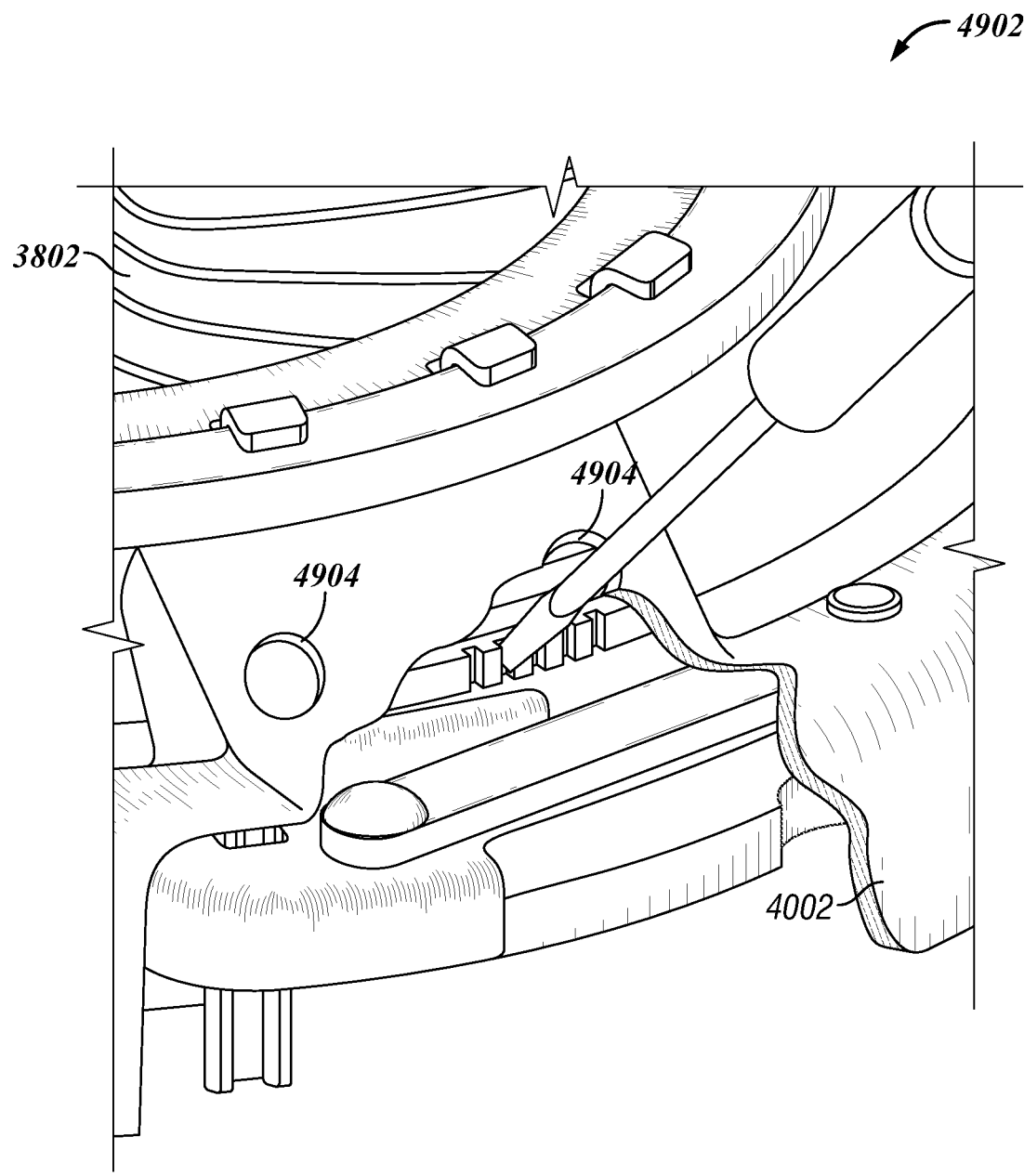
FIG. 12 depicts a close-up of portions of an example pressure plate.

Referencing FIG. 12, an example clutch adjustment assembly 4902 is depicted that provides for manual adjustment of the diaphragm spring 3802. The adjustment allowed by the example clutch adjustment assembly 4902 provides for adjustment of the diaphragm spring 3802, for example during maintenance, service, and/or installation, without disassembling the clutch assemblies or "dropping the transmission." Portions of the clutch adjustment assembly 4902 are distributed throughout different portions of the transmission, and the clutch adjustment assembly 4902 includes features specifically provided to allow the functions of the clutch adjustment assembly 4902, including to provide various beneficial characteristics of other portions of the present disclosure. The example clutch adjustment assembly 4902 includes a plurality of holes 4904 or channels provided on the diaphragm spring assembly bracket 4902, providing access for a tool to reach teeth of the cam ring 4504. The holes 4904 may be provided around the circumference of the diaphragm spring assembly bracket 4902, and/or at locations azimuthally where the holes 4904 will be accessible as installed. The holes 4904 may be sized for a standard tool (e.g. a screwdriver), and/or may be sized or keyed to a specific tool. The number and spacing of access channels or holes 4904 may be selected according to the number and position of features in the clutch assembly that allow for the manual rotation of the cam ring, such as the cam teeth 5002, baffle springs 5104, or other rotational adjustment features. Additionally, the sizing of the access channels or holes 5904 may be sized to allow for the passage of one or more tools 5106, such as specialized tools and/or a screwdriver or the like. In certain embodiments, more than one tool may be inserted to perform and adjustment—for example a first tool to disengage the baffle spring 5104 and a second tool to engage cam teeth or another cam ring feature (e.g., a notch, protrusion, detent, or the like) to facilitate rotation of the cam ring 4504.

Figure 13:
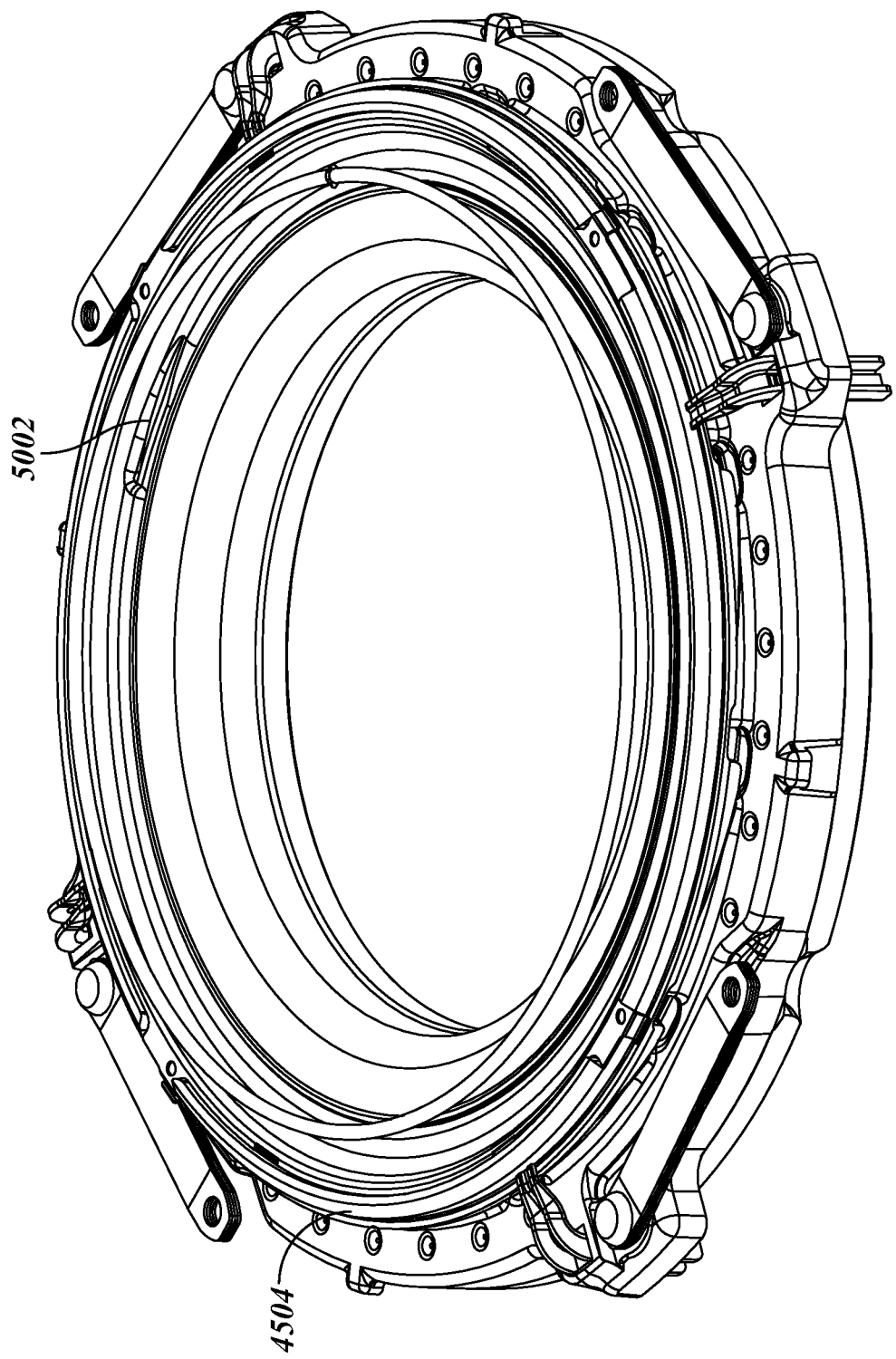
FIG. 13 depicts certain details of an example pressure plate.
Figure 14:
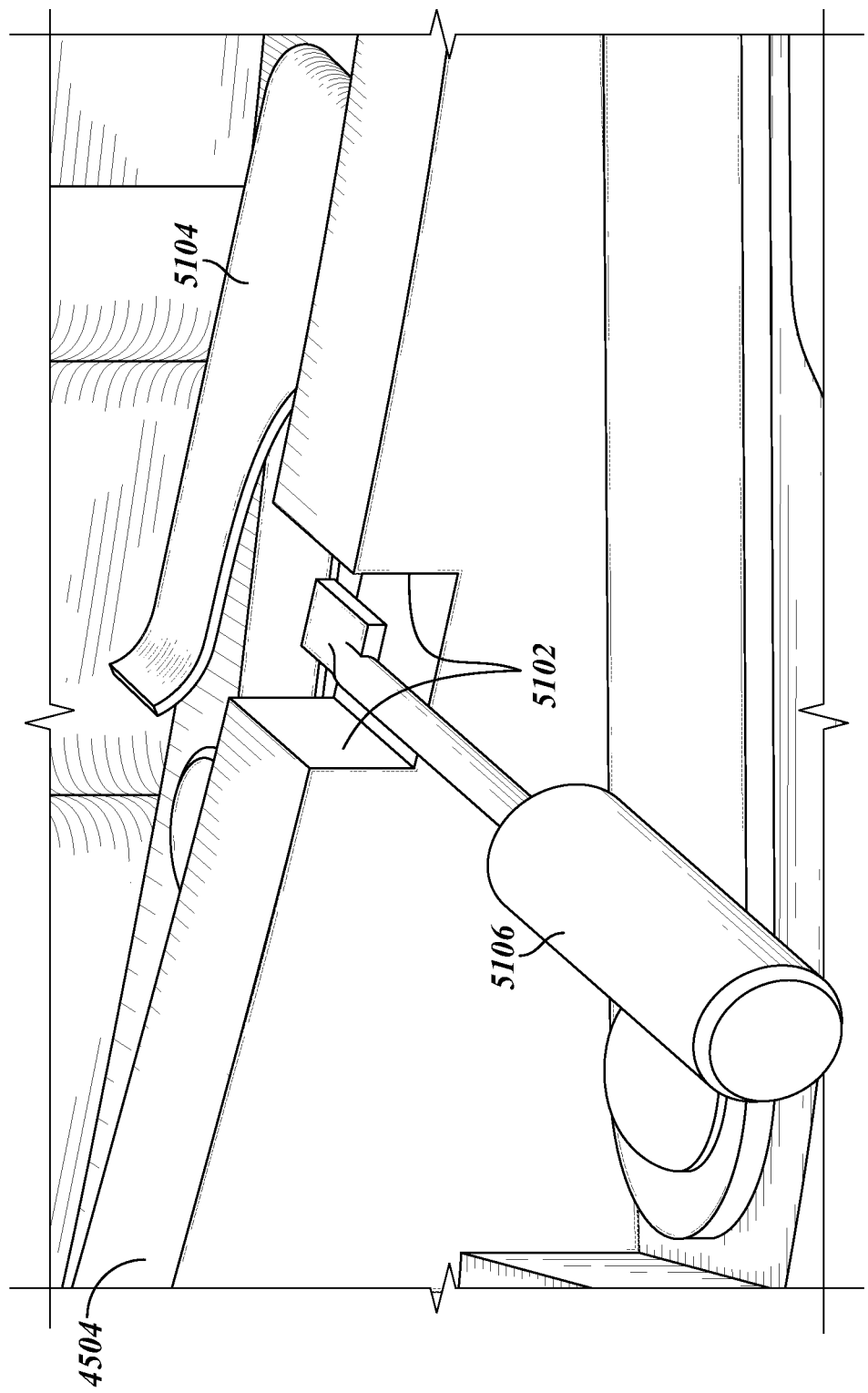
FIG. 14 depicts a close-up of portions of an example pressure plate.

Referencing FIG. 13, cam teeth 5002 are provided on an interior ring of the cam ring 4504 that provide for automatic adjustment of the cam ring 4504 by rotationally fixing the cam ring 4504 as it rotationally progresses, and/or that provide for a manual adjustment access for the clutch adjustment assembly 4902. Referencing FIG. 14, a channel 5102 is provided, for example in the pressure plate 4508, to access a baffle spring 5104 that engages baffle teeth on the cam ring 4504, allowing an operation to disengage the baffle spring 5104 and allow the cam ring 4504 to rotate. The channel 5102 may be any size or shape, and may be sized to a general tool (e.g. a screwdriver), and/or may be sized or keyed to a specific tool. An example tool 5106 is depicted which may be configured to engage the baffle spring 5104 to allow the cam ring 4504 to be rotated to the desired adjustment for the clutch. The example tool 5106 includes an offset at an insertion end of the tool 5106, such that the tool 5106 can be inserted through the channel 5102, and rotated to disengage the baffle spring 5104.

Figure 15:
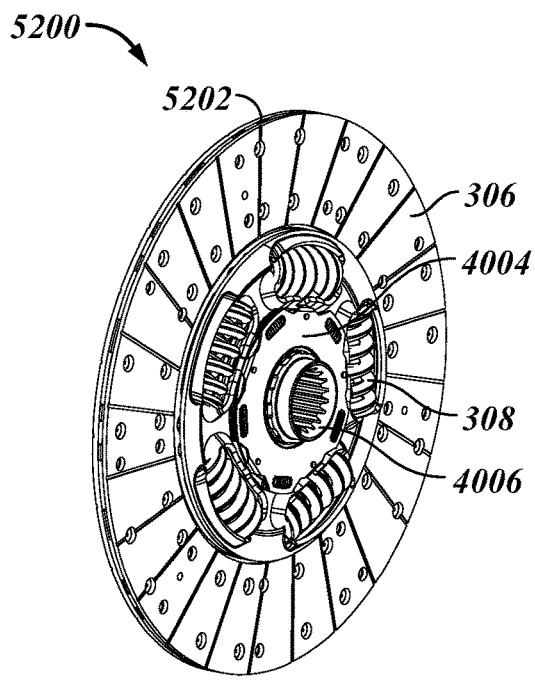
FIG. 15 depicts an example clutch driven disc.
Figure 16:
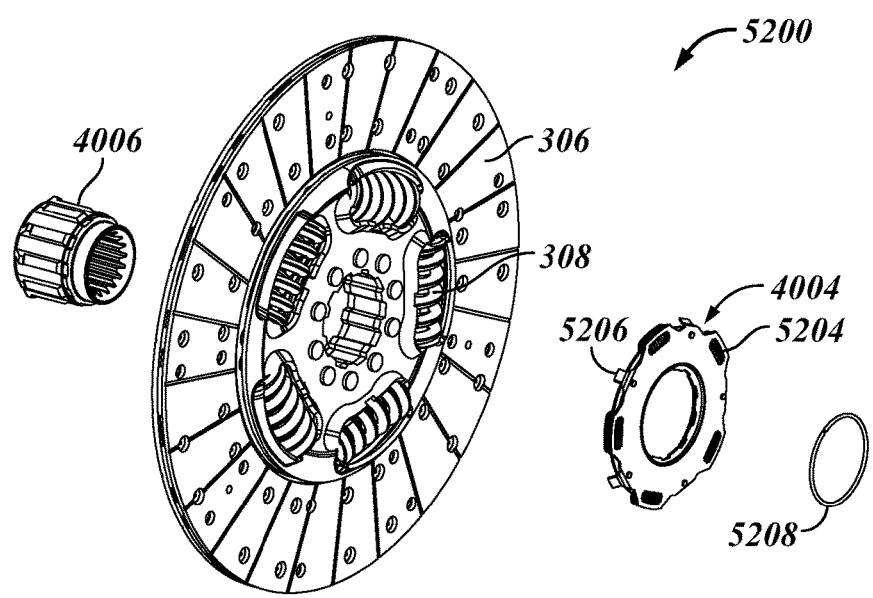
FIG. 16 depicts an example clutch driven disc in exploded view.
Figure 17:
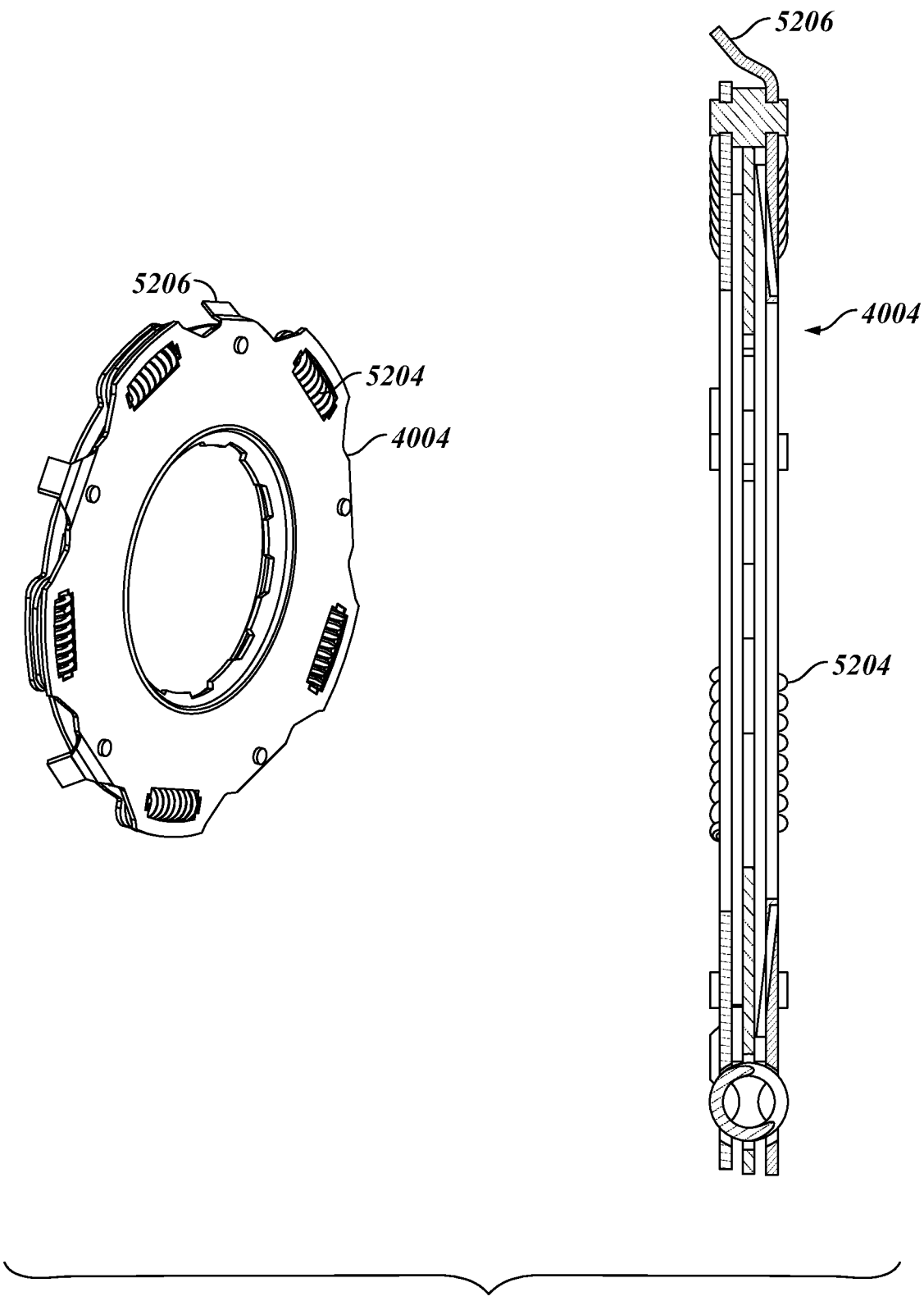
FIG. 17 depicts an example pre-damper assembly.
Figure 18:
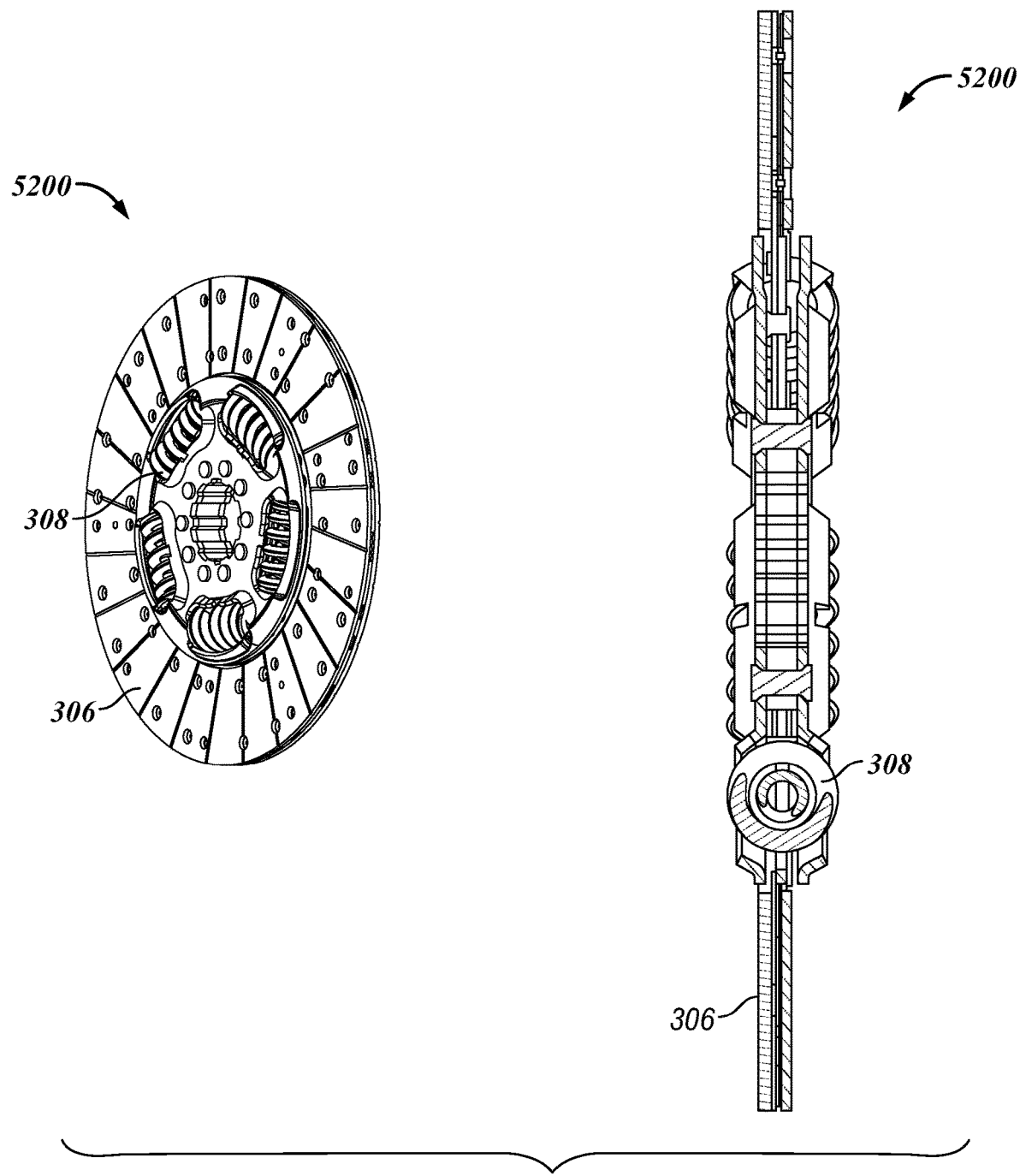
FIG. 18 depicts an example driven disc in perspective and cutaway side view.

Referencing FIG. 15, an example driven disc portion 5200 of a clutch assembly 4000 is depicted. The driven disc portion 5200 includes the clutch face 306, torsional springs 308, pre-damper assembly 4004, and inner hub 4006. Referencing FIG. 16, the example driven disc portion 5200 is depicted in exploded view. The clutch disc 5202 engages the inner hub 4006 to transfer torque from the prime mover to the input shaft 204. The example pre-damper assembly 4004 includes springs 5204, engagement tabs 5206 to rotationally couple the pre-damper assembly 4004 to the clutch disc 5202, and a snap ring 5208 that retains the pre-damper assembly 4004 to the inner hub 4006 and in engagement with the clutch disc 5202. Referencing FIG. 17, a side and perspective view of an example pre-damper assembly 4004 is depicted. Referencing FIG. 18, a side and perspective view of an example driven disc portion 5200 is depicted.

Various example embodiments of the present disclosure are described following. Any examples are non-limiting, and may be divided or combined, in whole or part. The example embodiments may include any aspects of embodiments throughout the present disclosure.

In certain embodiments, a clutch assembly 3800 includes an organic clutch face 306. An organic clutch face provides for consistent and repeatable torque engagement, but can be susceptible to damage from overheating. It will be recognized that certain aspects of example clutch assembly 3800 throughout the present disclosure support utilization of an organic clutch face 306. For example, clutch adjustment for clutch face wear improves controllability and repeatability of clutch engagement, allowing for close control of the clutch engagement and maintenance of clutch life.

In certain embodiments, certain features of an example clutch assembly 3800 enable servicing certain aspects of the transmission in a manner that reduces cost and service time relative to previously known clutch assemblies, as well as enabling servicing of certain aspects of the clutch assembly 3800 without performing certain operations that require expensive equipment and/or introduce additional risk (e.g. "dropping the transmission," and/or disassembling main portions of the transmission).

An example service event 5700 (reference FIG. 19) includes an operation 5702 to access a clutch cam ring 4504, and an operation 5704 to adjust the clutch cam ring 4504 to provide for a selected clutch adjustment position. In certain embodiments, accessing the clutch cam ring 4504 includes positioning a tool through a hole provided in a pressure plate 4508. The example service event 5700 further includes an operation 5706 to access a baffle spring 5104 structured to prevent rotation of the clutch cam ring 4504 in at least one direction, and to adjust the baffle spring 5104, for example to compress or disengage the baffle spring 5104 and allow the clutch cam ring 4504 to rotate. In certain embodiments, the operation 5706 to access the baffle spring 5104 includes accessing the baffle spring 5104 through a channel 5102 provided in the pressure plate 4508.

An example service event 5800 (reference FIG. 20) includes an operation 5802 to access a clutch release bearing 1118 from a front of the transmission. In certain embodiments, the clutch release bearing 1118 is accessed without accessing and/or adjusting the clutch actuator 1102. In certain previously known transmissions, a concentric clutch actuator (not shown) requires replacement and/or adjustment if the clutch release bearing 1118 is replaced or serviced. The example service event 5800 includes an operation 5804 to remove the clutch bearing 1118, and an operation 5806 to replace the clutch bearing 1118, without adjustment to the clutch actuator (not shown). Certain embodiments of the present disclosure include components that automatically adjust clutch position and operation such that, after replacing a clutch bearing 1118, no adjustment is required to the clutch actuator to resume operations of the transmission with equivalent or near-equivalent performance of the clutch actuation. In certain embodiments, a service event 5700 to adjust the clutch cam ring 4504 may be performed to provide equivalent or near-equivalent performance of clutch actuation without accessing or adjusting the clutch actuator.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may transform physical and/or or intangible items from one state to another.

The methods and systems described herein may also transform data representing physical and/or intangible items from one state to another.

Certain elements described and depicted herein relating to software, data, controls, instructions, and the like, including in flow charts and block diagrams throughout the figures, may by their context imply logical boundaries between the elements. However, according to software or hardware engineering practices, except where context indicates otherwise, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, embedded controllers, telematics systems, networking equipment, servers, routers, personal digital assistants, laptops, personal computers, mobile phones, other handheld computing devices, medical equipment, wired or wireless communication devices, transducers, chips, application specific integrated circuits (ASICS), calculators, satellites, tablet PCs, electronic books, gadgets, electronic devices, devices having artificial intelligence, computing devices, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application, method, component or system. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods described are provided by way of example. Absent an explicit indication to the contrary, the disclosed steps may be modified, supplemented, omitted, divided, and/or re-ordered without departing from the scope of this disclosure.

It will be appreciated that the methods and systems described are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A clutch assembly, comprising:
a clutch disc configured to engage a prime mover;
a pressure plate having a clutch biasing element, and a clutch engagement member structured to couple to a clutch actuation element at an engagement position;
a clutch adjustment member structured to maintain a consistent engagement position as a face of the clutch disc experiences wear;

wherein the clutch adjustment member comprises a cam ring operable to rotate in response to clutch disc wear, wherein the pressure plate defines the clutch biasing element and the clutch adjustment member, wherein the pressure plate further defines at least one access channel for the clutch adjustment member, wherein the clutch assembly further comprises an anti-rotation member operationally coupled to the clutch adjustment member to enforce one-way movement of the clutch adjustment member, and wherein the anti-rotation member comprises a baffle spring structured to engage teeth of the cam ring.

2. The clutch assembly of claim 1, wherein the pressure plate further defines at least one access channel for the anti-rotation member.

3. The clutch assembly of claim 1, wherein the at least one access channel is sized to allow an insertion of a tool having an offset at an insertion end of the tool.

4. A clutch assembly, comprising:
a clutch disc configured to engage a fly wheel of a prime mover;
a pressure plate having a diaphragm spring structured to bias the clutch disc to an engaged position; and
a cam ring structured to rotate in response to clutch disc wear, and thereby maintain a consistent engagement position of the clutch disc to the fly wheel,
wherein the diaphragm spring is structured to receive a linear actuating force, and
wherein the clutch disc is moved to a disengaged position in response to the linear actuating force.

5. The clutch assembly of claim 4, wherein a rotation of the cam ring adjusts a clutch face position.

6. The clutch assembly of claim 5, further comprising at least one control finger structured to limit a maximum adjustment of the clutch face position by the cam ring.

7. A method, comprising:
adjusting a position of a clutch face for a clutch assembly, the adjusting comprising:
accessing teeth of a cam ring; and
rotating the cam ring; and
disengaging a baffle spring from the teeth of the cam ring before the rotating the cam ring.

8. The method of claim 7, wherein the accessing the teeth of the cam ring comprises accessing the teeth of the cam ring through a channel in a housing defining the clutch assembly.

9. The method of claim 7, further comprising accessing the baffle spring through an access channel of a pressure plate of the clutch assembly.

10. A method, comprising:
adjusting a position of a clutch face for a clutch assembly, the adjusting comprising:
accessing teeth of a cam ring; and
rotating the cam ring,
wherein the accessing the teeth of the cam ring is performed on the clutch assembly installed in a vehicle, without disengaging a transmission including the clutch assembly from a prime mover.

11. The method of claim 10, wherein the accessing the teeth of the cam ring comprises accessing the teeth of the cam ring through a channel in a housing defining the clutch assembly.

12. A method, comprising:
adjusting a position of a clutch face for a clutch assembly, the adjusting comprising:
accessing teeth of a cam ring; and
rotating the cam ring; and
installing a new clutch assembly on a transmission, and adjusting the position of the clutch face for the clutch assembly after the installing.

13. The method of claim 12, wherein the adjusting the position of the clutch face is performed with the transmission engaged to a prime mover.

14. The method of claim 12, wherein the accessing the teeth of the cam ring comprises accessing the teeth of the cam ring through a channel in a housing defining the clutch assembly.

* * * * *